Aug. 22, 1939  E. T. LARKIN  2,170,058
INTERNAL COMBUSTION ENGINE
Filed April 21, 1937   4 Sheets-Sheet 2
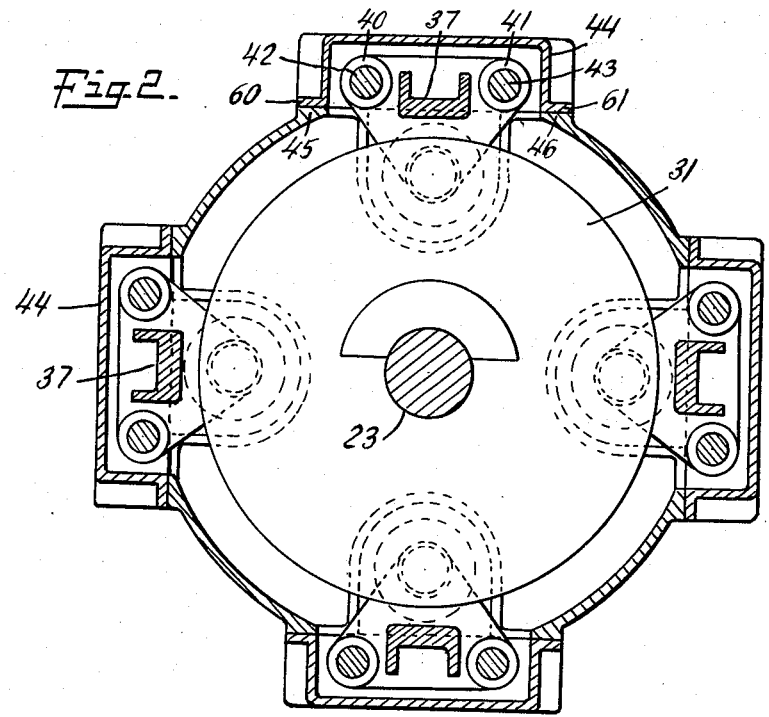
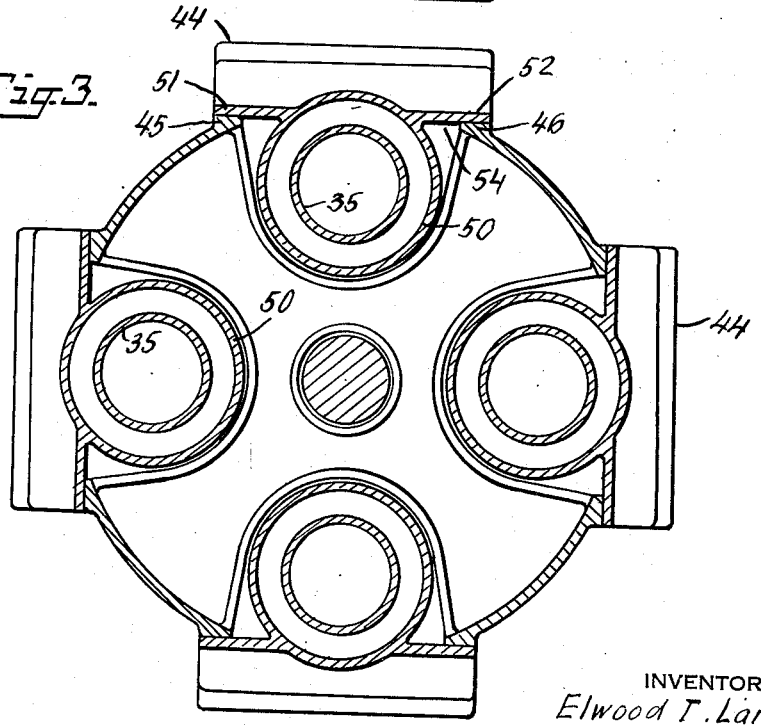
INVENTOR
Elwood T. Larkin
BY
Marshall & Hawley
ATTORNEYS Aug. 22, 1939.                E. T. LARKIN                2,170,058
                      INTERNAL COMBUSTION ENGINE
                        Filed April 21, 1937        4 Sheets-Sheet 3
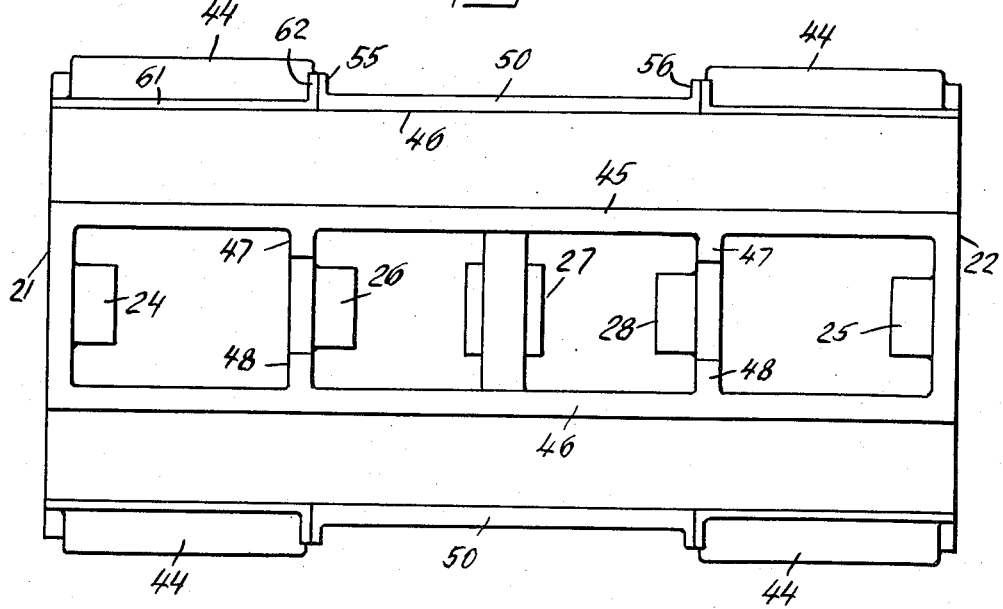
INVENTOR
Elwood T. Larkin
BY
ATTORNEYS Aug. 22, 1939  E. T. LARKIN  2,170,058
INTERNAL COMBUSTION ENGINE
Filed April 21, 1937  4 Sheets-Sheet 4
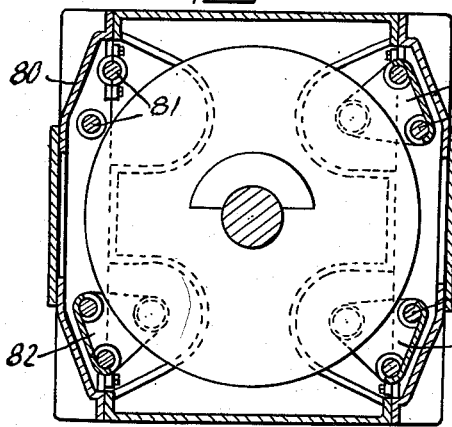
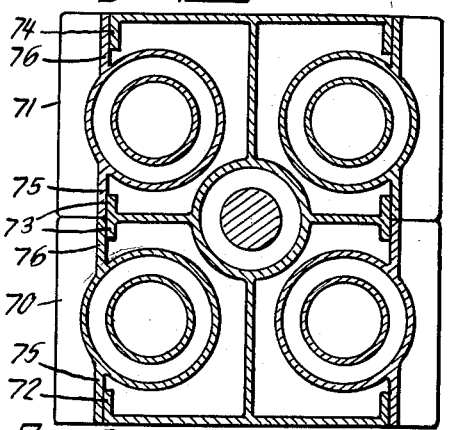
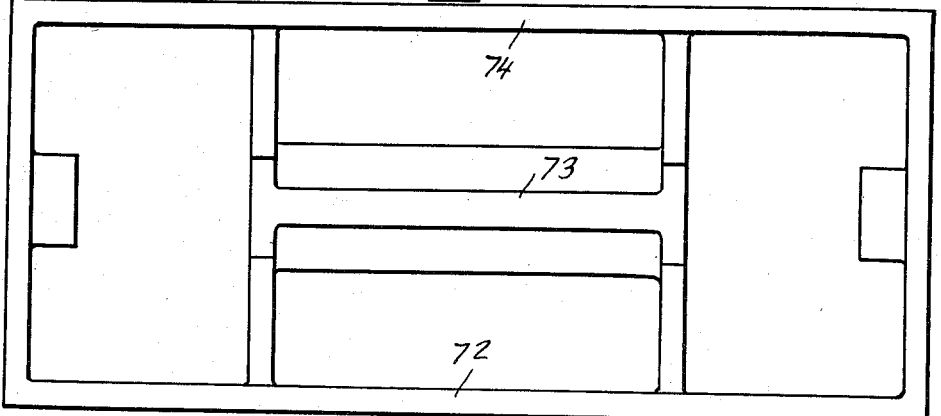
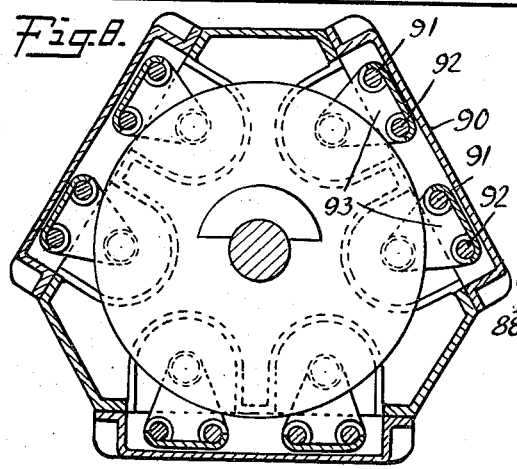
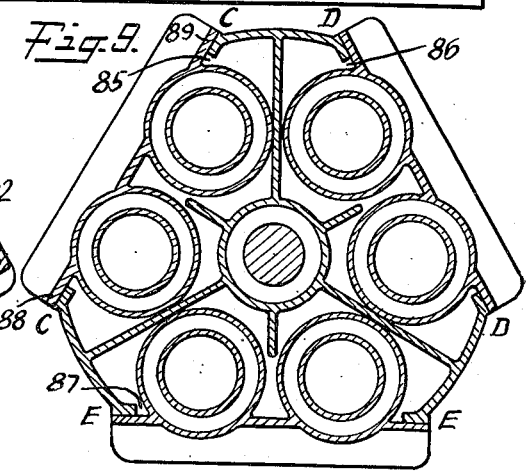
INVENTOR
Elwood T. Larkin
BY
Marshall H Hawley
ATTORNEYS Patented Aug. 22, 1939

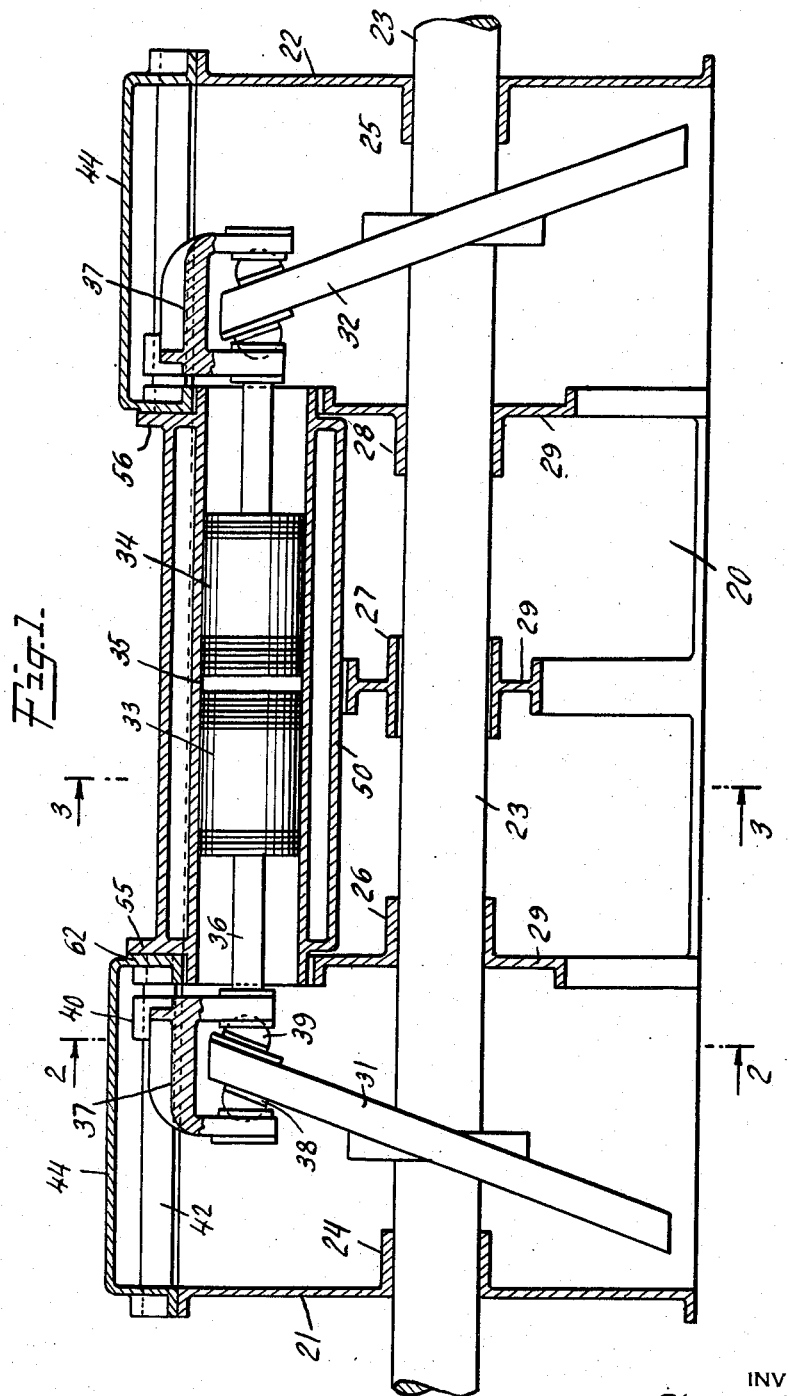

2,170,058

UNITED STATES PATENT OFFICE 2,170,058

INTERNAL COMBUSTION ENGINE

Elwood T. Larkin, Buffalo, N. Y., assignor to Michell-Crankless Engines Corporation, New York, N. Y., a corporation of New York Application April 21, 1937, Serial No. 138,145

8 Claims. (Cl. 123—58)

This invention relates to internal combustion engines.

More particularly, the invention relates to engines of the "crankless" type in which the cylinders are disposed parallel to the engine shaft, although it should be understood that the principles of construction embodied in the invention also apply to other mechanisms, such as pumps, in which the shaft is the driving instead of the driven member.

In engines of the type specified, it is frequently desirable to avoid building the cylinder units integral with the principal structure of the engine. The considerations involved affect both manufacturing and servicing problems.

The construction is particularly well adapted for use in engines of the opposed piston type, such as described in Reissue Patent No. 17,272 of April 16, 1929.

This invention has for its salient object to provide an engine construction of the type specified in which the parts can be easily and accurately manufactured and quickly assembled and disassembled.

Another object of the invention is to provide an engine structure of the character specified having the casing and cylinder supporting surfaces so relatively constructed and arranged that the cylinders will be accurately located and positioned on the casing.

Another object of the invention is to provide an engine of the character described having cylinders parallel to the shaft and operatively connected thereto, by means of yokes, bearing members and a slant, the structure being so arranged that the cylinders can be manufactured as separate units and assembled on the engine structure or casing and the yokes and guides therefor can also be separately assembled and will be held in the proper relation to the cylinder castings.

Further objects of the invention will appear from the following specification taken in connection with the drawings which form a part of this application, and in which—

Fig. 1 is a longitudinal sectional elevation of an engine constructed in accordance with the invention;

Fig. 2 is a transverse sectional elevation on an enlarged scale taken on line 2—2 of Fig. 1;

Fig. 3 is an enlarged sectional elevation taken substantially on line 3—3 of Fig. 1;

Fig. 4 is a plan view on a smaller scale of a portion of the engine casing shown in Fig. 1, illustrating the flanges and openings for receiving the cylinders and casing covers;

Fig. 5 is a transverse sectional elevation taken on a plane corresponding to the plane indicated at 2—2 of Fig. 1, but illustrating a modified form of construction;

Fig. 6 is a view similar to Fig. 5 but taken on a plane corresponding to the plane indicated at 3—3 of Fig. 1;

Fig. 7 is a plan view of one side of the engine casing shown in Figs. 5 and 6, with the cylinders and covers removed; and Figs. 8 and 9 are transverse sectional elevations similar to Figs. 5 and 6 but illustrating a construction in which six cylinders grouped in three pairs are located around the shaft.

The invention briefly described consists of an engine of the type in which the cylinders and pistons are arranged parallel to the engine shaft, the cylinders and piston guiding mechanism being made and assembled separately or in separate units, such as in pairs, the cylinder units being assembled on the engine casing through openings having flanges or plane surfaces adapted to receive and have secured thereto flanges formed on the cylinder units. The surfaces to which the cylinder units are secured are plane surfaces disposed parallel to the engine shaft. The foregoing statement also applies to the casing covers and the casing surfaces to which the covers are secured, the casing covers having mounted therein the piston yokes and guiding means therefor. Furthermore, the covers and cylinder units are so relatively constructed and arranged that these parts are provided with abutting flanges which can be secured and sealed together to close the engine casing.

Further details of the invention will appear from the following description.

In the particular embodiment of the invention illustrated in Fig. 1, there is shown an engine casing 20 having end walls 21 and 22, carrying the shaft bearings 24 and 25. Shaft bearings 26, 27 and 28 carried by walls 29 disposed transversely in the engine casing are also indicated.

The engine shown in Fig. 1 is of the opposed piston type, although it should be understood that the invention is not in any way limited to this particular type of engine, but can be used equally well in an engine having a single slant in which the cylinders are closed at end away from slant.

The shaft 23 shown in Fig. 1 has secured thereto a pair of slants 31 and 32 which are oppositely inclined and are actuated by oppositely acting pistons 33 and 34 mounted in a cylinder 35. The pistons have secured thereto piston rods 36 which have secured to the ends thereof yokes 37 in which are mounted oppositely facing slipper pads 38 and 39 which engage the faces of the slants and so transmit the reciprocating movement of the pistons to the shaft 23.

The yoke 37 has formed therein bearings 40 and 41 which are mounted on rods 42 and 43 carried by the casing covers 44.

The construction above described is formed in the manner which will now be explained. In the form of the invention illustrated in Figs. 1–4 inclusive, the engine casing is provided with mounting surfaces 45, 46 which are in a plane parallel to the shaft axis and of sufficient length to accommodate cylinder and casing covers. Intermediate the ends of the surfaces 45 and 46 the casing may be provided with oppositely extending supports 47 and 48 to form a better joint between the cylinder and casing covers.

The cylinders in the engine shown in Fig. 1 are made as separate units, the construction being shown particularly in Fig. 3, from which it will be seen that the cylinder 35 with its water jacket 50 are made as one piece and have extending laterally therefrom flanges 51 and 52. The opening in the engine casing which is shown at 54 and is defined by the surfaces 45, 46 is so dimensioned and the flanges 51 and 52 of the cylinder units are so arranged that the flanges seat on the surfaces 45, 46 in a plane parallel to the shaft 23 of the engine.

From the showing in Fig. 1 it will be noted that adjacent the ends of the cylinder units this unit has formed thereon outwardly extending flanges 55 and 56 which are disposed at right angles to the axis of the shaft 23.

The casing covers 44 for the engine shown in Fig. 1 are illustrated in Figs. 1 and 2. Each cover 44, as above explained, has mounted therein the guide rods 42 and 43, on which is mounted the yoke 37. The covers have flanges on their inner surface, as shown at 60 and 61, which seat on the surfaces 45, 46 in the manner shown in Fig. 2. Each cover also has formed thereon a flange 62 which abuts against one of the flanges 55 and 56 of the cylinder unit.

In Figs. 1–3 inclusive, there are shown four cylinders grouped around the shaft 23, each cylinder being indicated as a separate unit.

Figs. 5 and 6 illustrate a slightly modified form of construction in which adjacent cylinder units 70 and 71 are mounted on a plane B, B defined by the surfaces 72, 73 and 74 formed on the sides of the casing. Each cylinder unit has laterally extending flanges 75 and 76 which are mounted on the surfaces 72, 74 and 73.

Fig. 5 illustrates a cover construction adapted for use on the engine illustrated in Fig. 6. Each cover 80 in this engine carries the rods 81 for the guidance of yoke 82.

Fig. 7 is a plan view of the casing shown in Fig. 6 with the cylinders and covers removed. The central supporting surface is shown at 73 and the side supporting surfaces are shown at 72 and 74.

In the form of the invention illustrated in Figs. 8 and 9 there is shown a six cylinder engine in which the cylinder units are made in pairs and are mounted in the manner similar to that shown in the preceding figures and also in which the covers are constructed to mount the guide rods and yokes for a pair of cylinders.

In Fig. 9 the engine casing is shown as having three openings 85, 86 and 87, the outer surfaces of the casing adjacent the openings being disposed in planes C, C, D, D and E, E parallel to the shaft 23. As above explained, each cylinder unit or casting has formed therein two cylinders and these castings have laterally extending flanges 88 and 89 which engage the outer surfaces on the casing adjacent the openings.

In Fig. 8 the cover construction is illustrated and from this showing it will be noted that each of the covers 90 has mounted therein two sets of guide rods 91 and 92, yokes 93 being mounted on the rods.

From the foregoing description it will be clear that a simple and practical crankless type of engine has been designed and that the cylinders, yokes and yoke guiding means can be easily and quickly assembled and quickly mounted on the casing or removed therefrom. In the event that trouble is encountered with one of the cylinders, this cylinder can be quickly removed and a new cylinder can be mounted in position. Furthermore, by reason of the relative construction of the supporting surfaces and the flanges or parts of the cylinder units and casing covers, the positive and accurate positioning of these parts is assured.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In crankless mechanism of the character described, a casing, a shaft mounted in said casing and extending longitudinally thereof, said casing having a longitudinal opening therein, and a cylinder movable through the opening into the casing and supported on the longitudinal walls of the casing surrounding said opening, in a position parallel to said shaft.

2. In crankless mechanism of the character described, a casing, a shaft mounted in said casing and extending longitudinally thereof, said casing having a longitudinal opening therein, and a cylinder movable through the opening into the casing and supported on the longitudinal walls of the casing surrounding said opening, in a position parallel to said shaft, said cylinder being supported on a plane parallel to the shaft.

3. In crankless mechanism of the character described, a casing, a shaft mounted in said casing and extending longitudinally thereof, a transmission for said shaft in the casing, said casing having a longitudinal opening thereon, a cylinder movable through the opening and supported on the wall of the casing surrounding said opening, in a position parallel to said shaft, said opening extending beyond an end of the cylinder, a cover mounted over said extending portion of the opening and supported on the casing, a piston in the cylinder, and means carried by the cover connected to the piston and coacting with the transmission to transmit the piston movement to the shaft.

4. In crankless mechanism of the character described, a casing, a shaft mounted in said casing and extending longitudinally thereof, a transmission for said shaft in the casing, said casing having a longitudinal opening thereon, a cylinder movable through the opening and supported on the wall of the casing surrounding said opening, in a position parallel to said shaft, said opening extending beyond an end of the cylinder, a cover mounted over said extending portion of the opening and supported on the casing, a piston in the cylinder, and means including a yoke carried by the cover connected to the piston and coacting with the transmission to transmit the piston movement to the shaft.

5. In crankless mechanism of the character described, a casing, a shaft mounted in said casing and extending longitudinally thereof, a transmission for said shaft, said casing having a longitudinal opening therein, a cylinder unit movable through the opening and supported on the wall of the casing surrounding said opening, in a position parallel to said shaft, a cover mounted over a portion of the opening and supported on the casing, a piston in the cylinder, and means carried by the cover connected to the piston and coacting with the transmission to transmit the piston movement to the shaft, said cylinder unit having one end abutting and contacting one end of the cover.

6. In crankless mechanism of the character described, a casing, a shaft mounted therein, a plurality of cylinders mounted in the casing, disposed around and parallel to the shaft and equidistant therefrom, said casing having a plurality of longitudinally extending openings therein and said cylinders being made as units, the units being mounted in and supported substantially throughout their lengths on the walls of said openings and disposed within the casing.

7. In crankless mechanism of the character described, a casing, a shaft mounted therein, a plurality of cylinders mounted in the casing, disposed around and parallel to the shaft and equidistant therefrom, said casing having a plurality of longitudinally extending openings therein and said cylinders being made as units, the units being mounted in said openings and disposed within the casing, each unit being supported on a plane parallel to the shaft, the longitudinal center lines of said planes being disposed equidistant from the shaft.

8. In crankless mechanism of the character described, a casing, a shaft mounted therein, a transmission for the shaft, a plurality of cylinder units in said casing, the cylinders being disposed parallel to and equidistant from the shaft, said casing having longitudinal openings and said cylinders being mounted in said openings, each unit comprising a pair of cylinders, covers mounted on the casing over portions of said openings, pistons in the cylinders, and means carried by said covers for operatively connecting the pistons to the transmission to drive the transmission, the planes of contact between the cylinder units and casing being disposed substantially parallel to the shaft, and said casing covers abutting the cylinder units at one end.

ELWOOD T. LARKIN.